United States Patent
Maurin et al.

(10) Patent No.: US 6,765,192 B2
(45) Date of Patent: Jul. 20, 2004

(54) PROCESSING SYSTEM WITH PROTECTIVE DEVICE FOR SECURE PROCESSING TABLE

(75) Inventors: Denis Maurin, Andernos (FR); Eric Terrasse, Canejan (FR)

(73) Assignee: Lectra SA, Cestas (FR)

( * ) Notice: Subject to any disclaimer, the term of this patent is extended or adjusted under 35 U.S.C. 154(b) by 151 days.

(21) Appl. No.: 10/168,747
(22) PCT Filed: Dec. 12, 2000
(86) PCT No.: PCT/FR00/03477

§ 371 (c)(1),
(2), (4) Date: Jun. 24, 2002

(87) PCT Pub. No.: WO01/48417

PCT Pub. Date: Jul. 5, 2001

(65) Prior Publication Data

US 2002/0190191 A1 Dec. 19, 2002

(30) Foreign Application Priority Data

Dec. 24, 1999 (FR) .............................. 99 16472

(51) Int. Cl.[7] .............................................. H01J 40/14
(52) U.S. Cl. ...................................... 250/221; 340/555
(58) Field of Search ............................. 250/221, 222.1, 250/223 R, 208.4, 234; 340/555, 556, 557

(56) References Cited

U.S. PATENT DOCUMENTS

| | | | |
|---|---|---|---|
| 3,792,260 A | | 2/1974 | Stewart et al. |
| 3,842,260 A | * | 10/1974 | Christensen et al. ........ 250/221 |
| 3,851,168 A | | 11/1974 | Erbstein |
| 4,328,726 A | | 5/1982 | Pearl |
| 4,385,508 A | | 5/1983 | Schimko |
| 4,446,602 A | * | 5/1984 | Marx et al. .................. 19/0.21 |

* cited by examiner

Primary Examiner—Kevin Pyo
(74) Attorney, Agent, or Firm—Smith, Gambrell & Russell, LLP

(57) ABSTRACT

The invention relates to a moving assembly for a working system, said assembly including:

a boom (22) extending along an axis between first and second ends (31, 33) and a working head (30) mounted on said boom;

first and second lateral obstacle sensor systems (40, 42, 77, 83, 90, 92, 100, 102) mounted at each end of the boom; and respective first and second optical systems (50, 52, 60, 62, 75, 79) fixed to the first and second lateral obstacle sensor systems to detect the presence of an obstacle on the path of the boom and movement and/or deformation of one lateral obstacle sensor system relative to the other one.

26 Claims, 8 Drawing Sheets

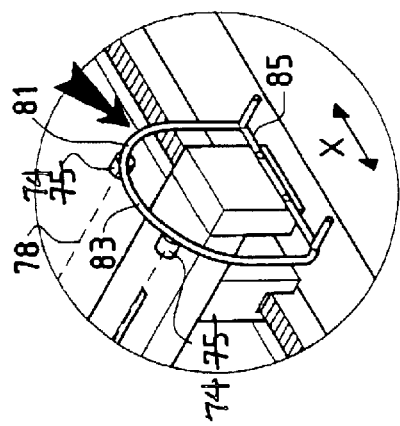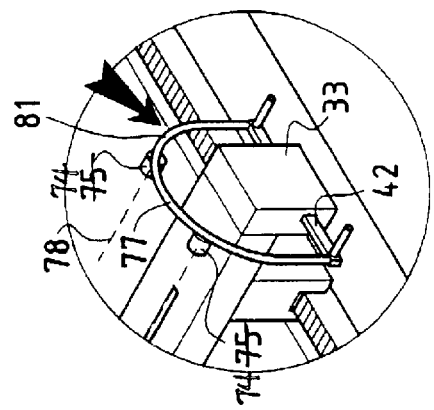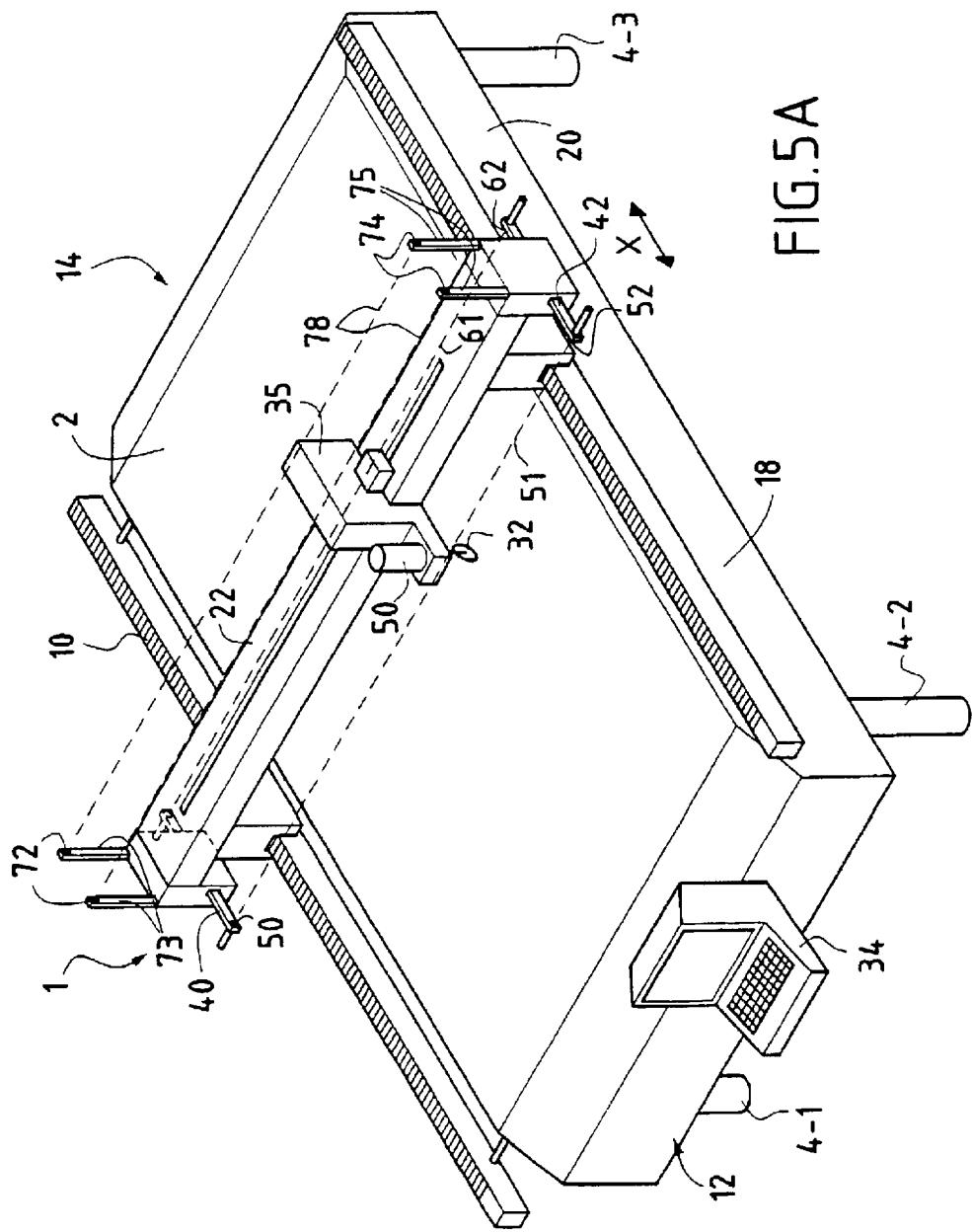

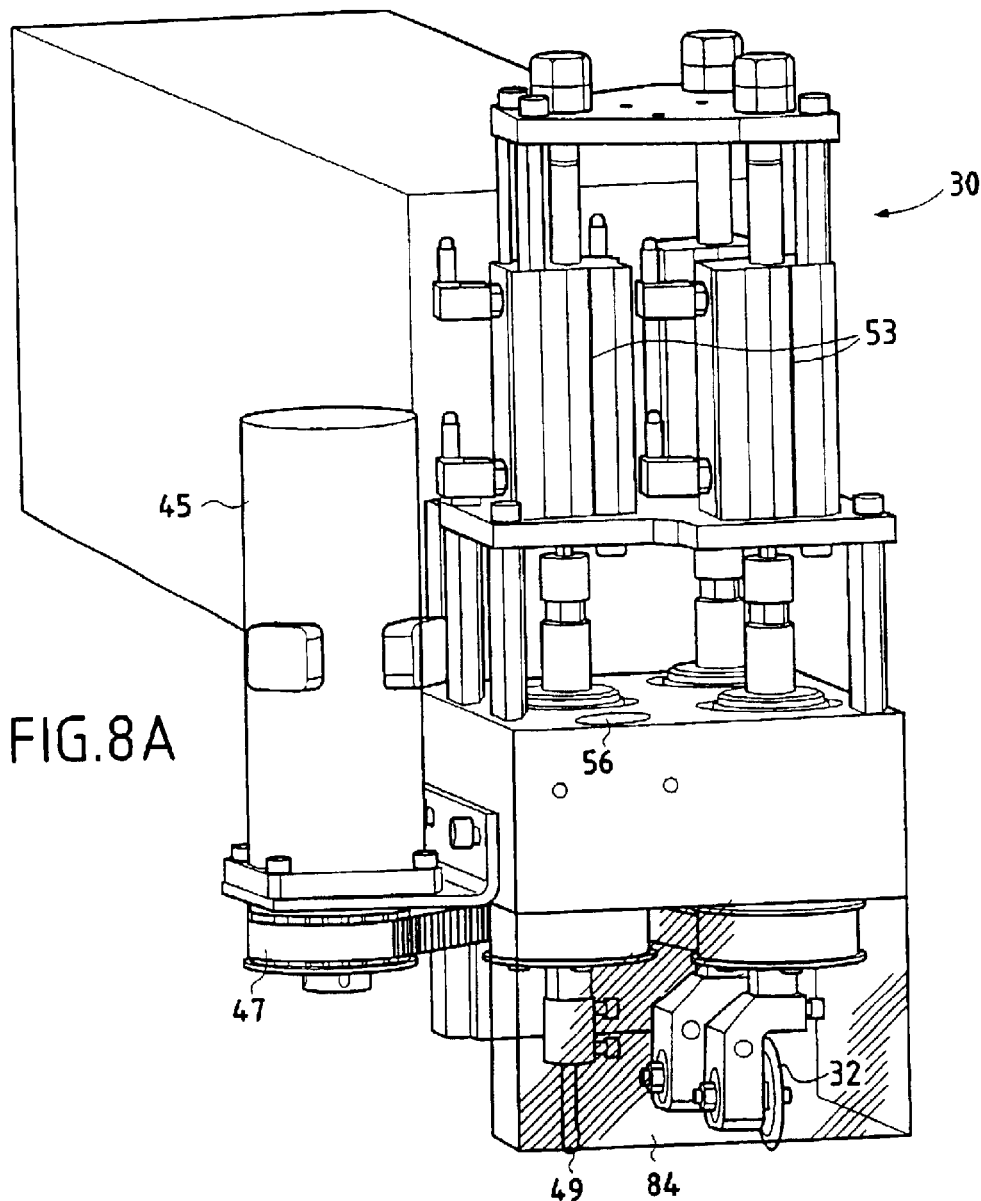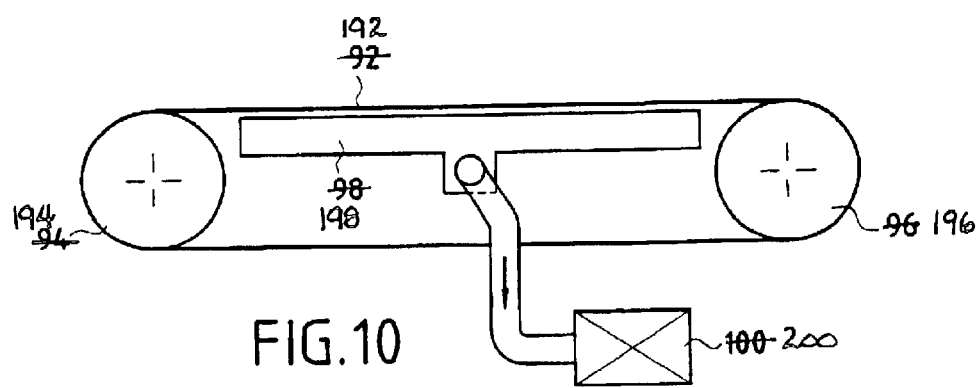

PROCESSING SYSTEM WITH PROTECTIVE DEVICE FOR SECURE PROCESSING TABLE

TECHNICAL FIELD AND PRIOR ART

The invention relates to a system comprising a processing or work table over which a boom can move. The boom supports a head equipped with one or more tools. In a preferred application, the head is equipped with one or more cutting tools.

The invention also relates to a safety system, in particular of the type intended for work tables, for example cutting tables.

The invention applies to cutting machines and to machines for processing sheet materials, in particular labeling systems or machines for printing sheet materials.

Cutting tables are used to cut flexible materials, for example textile materials, using a penetrating blade or laser beams, for example.

They are more particularly intended for use in the furnishing or tailoring industries, especially in prototyping and making-to-measure, and for use in some applications for cutting technical fabric.

FIGS. 1A and 1B show one example of a cutting table.

The cutting table includes a table 2 generally comprising cutting supports 17, 19 fixed or stuck to boxes 18, 20 (FIG. 1B). The boxes are isolated from each other and supported on a system of legs 4-1, 4-2, 4-3 (FIG. 1A) and stringers (not shown in the figures).

A suction system is fixed under each box. These cutting support plates are hard and porous.

The tops of the boxes, on which the cutting plates rest, are perforated. The suction system therefore holds down the material through the boxes and the cutting plates.

Two rails 8 and 10 are fixed to the boxes 18 and 20 on respective opposite sides of the table and guide a moving boom 22 as it moves in either direction along the longitudinal axis X of the table between a front area 12 and a rear area 14 of the table.

The boom 22 is equipped with a cutting head 30 mounted on a carriage 35 movable along the boom in a direction Y substantially perpendicular to the direction of the axis X. The cutting head is equipped with a cutting blade 32 for cutting out required shapes from a flexible material, for example a textile material, placed on the table.

A control console 34 generally including a microcomputer (PC) controls the starting of cutting and movements of both the boom 22 and the cutting head 30 to produce pieces from the flexible material. An operator controls the system by means of a keyboard and a display screen which enable the operator to display the lay out of parts to be produced from sheets of flexible material.

This kind of cutting system is accessible from both sides, as well as from the front and the rear of the table, to enable maintenance operations, bringing up and loading a flexible material, offloading pieces cut out from the material, and monitoring cutting.

This kind of cutting table is generally relatively long, for example from 3 to 18 meters long.

Thus an operator 16 generally monitors cutting by moving around the table. Movement of the boom 22 along the axis X can impact laterally on the operator. This raises a problem of safety in the working and maintenance area around the cutting machine.

A first solution to this problem consists of equipping the moving boom with lateral safety bars 40, 42 which are moving relative to the support carriages 31, 33 at the ends of the boom.

FIG. 2 shows in more detail the mounting of a protection bar 40 on its carriage 31. The bar passes through guide members 53, 57 fixed to the carriage 31. An electromechanical sensor 41 is also fixed to the carriage 31. One end of the sensor locates in a notch 39 in the bar 40. The bar 40 is moved relative to the carriage 31 when it encounters an obstacle during movement of the boom 22 along the X axis.

The end of the sensor 41 then leaves the notch 39, which trips a switch and cuts off the power supply to the drive system of the boom 22.

Although that kind of system is satisfactory in some respects, it does not address a number of problems. The problem therefore arises of proposing a safer cutting system.

In particular, the above type of system cannot detect the presence of an operator's arm or hand above one end of the boom 22. The operator can be sufficiently far away from the cutting table for the lateral bars on his side of the table not to strike him, in which case the safety system is not tripped, but nevertheless the operator can have a hand or an arm positioned above the end of the boom.

What is more, the above type of prior art system cannot detect an obstacle near the boom.

An obstacle near the boom could be on the surface of the cutting table, for example a foreign body which could form a dangerous projectile if struck by the boom and/or the cutting head.

An obstacle near the boom could equally well be above the surface of the cutting table, for example an operator's hand approaching the boom 22 or the support 35.

SUMMARY OF THE INVENTION

For the above reasons the invention provides a moving assembly for a system for working or processing flexible materials, especially materials used in tailoring, or textile materials, the assembly comprising:

a boom extending along an axis between first and second ends and a working head mounted on said boom;

first and second lateral obstacle sensor systems mounted at each end of the boom, movable or deformable relative to the boom and independently of each other in a direction (X) substantially perpendicular to the axis of the boom, and having an extension in the same direction on either side of the boom; and respective first and second optical systems fixed to the first and second lateral obstacle sensor systems to detect the presence of an obstacle on the path of the boom and movement and/or deformation of the lateral obstacle sensor systems relative to each other.

Lateral obstacles, or an obstacle on the path of the moving boom, are therefore detected optically.

The optical system preferably comprises one or more pairs of emitters and sensors, with each emitter mounted on one of the lateral obstacle sensor systems and the corresponding sensor mounted on the other lateral obstacle sensor system.

In one variant, the first optical system comprises an emitter-receiver pair mounted on one of the lateral obstacle sensor systems and the second optical system comprises a system mounted on the other lateral obstacle sensor system to reflect a beam emitted by the emitter towards the receiver.

Optical systems for detecting obstacles on the path of the boom can additionally be mounted on the boom, and rigidly or deformably connected to it.

The optical systems mounted on the boom and fixed relative to the lateral obstacle sensor systems then define a safety volume around the boom.

The first and second lateral obstacle sensor systems may be movable independently of each other relative to the boom, in a direction substantially perpendicular to the axis of the boom, with an extension in the same direction on either side of the boom.

Respective first and second movement sensor systems, for example electromechanical sensors, may be associated with the first and second lateral obstacle sensor systems.

The optical systems mounted on the lateral obstacle sensor systems then constitute a second level of safety measures in the event non-operation of the movement sensor system associated with the first and/or second lateral obstacle sensor system in response to detection of a lateral obstacle.

In another embodiment, the first and second lateral obstacle sensor systems comprise at least one support that can be deformable in a direction perpendicular to the axis of the boom and is mounted on the first and/or second lateral obstacle sensor system.

Furthermore, optical systems can be fixed to the deformable support to detect obstacles on the path of the boom and to detect deformation of the deformable support in said direction perpendicular to the axis of the boom.

In another embodiment, the first and/or the second lateral obstacle sensor system has a first part movable in said direction substantially perpendicular to the axis of the boom and a second part articulated to the first part and able to rotate about an axis substantially perpendicular to said direction, and either the first optical system or the second optical system is fixed to this second part.

In another aspect, the first lateral obstacle sensor system has first and second parts movable relative to each other and each part is provided with an optical system for detecting the presence of an obstacle on the path of the boom and movement of one of the lateral obstacle sensor systems relative to the other one.

The second lateral obstacle sensor system may additionally have third and fourth parts movable relative to each other, with each part provided with an optical system for detecting the presence of an obstacle on the path of the boom and movement of one of the lateral obstacle sensor systems relative to the other one.

An optical element is advantageously disposed on an optical path defined between the first and second lateral obstacle sensor systems. This optical element is additionally connected to the cutting head and its position relative to the latter changes if it encounters an obstacle during movement of the boom and the cutting head.

In a further aspect, the cutting head includes a protective cover that protects it when closed and which intercepts an optical path defined between the first and second fixed optical systems on the first and second lateral obstacle sensor systems.

The invention also provides a system for processing flexible materials, the system comprising:
   a work support or table;
   one or more moving assemblies as described hereinabove; and
   a system for moving said moving assembly or assemblies on the work support or table.

The moving assembly, with its safety systems, is suitable for work tables whose width is from 0.3 meters (m) to 5 m, for example, and for a maximum speed of the boom from 0 to 3 meters per second (m/s) (180 m/min), for example.

The work table can be fixed or moving, in the latter case incorporating a conveyor.

The working head supports a cutting tool and/or a printing tool and/or a labeling tool and/or a perforation tool, for example.

BRIEF DESCRIPTION OF THE DRAWINGS

The features and advantages of the invention become more apparent in the light of the following description, which relates to embodiments provided by way of non-limiting and explanatory example only, and refers to the accompanying drawings, in which:

FIGS. 3A to 9 show various embodiments of the invention.

FIG. 10 shows diagrammatically a table incorporating a moving conveyor.

DETAILED DESCRIPTION OF EMBODIMENTS OF THE INVENTION

Figure 3A:
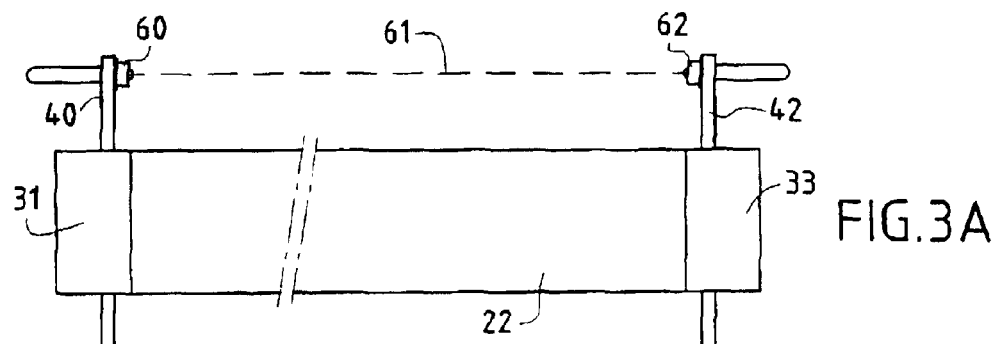

A moving assembly in accordance with the invention is described first with reference to FIG. 3A.

Figure 1A:
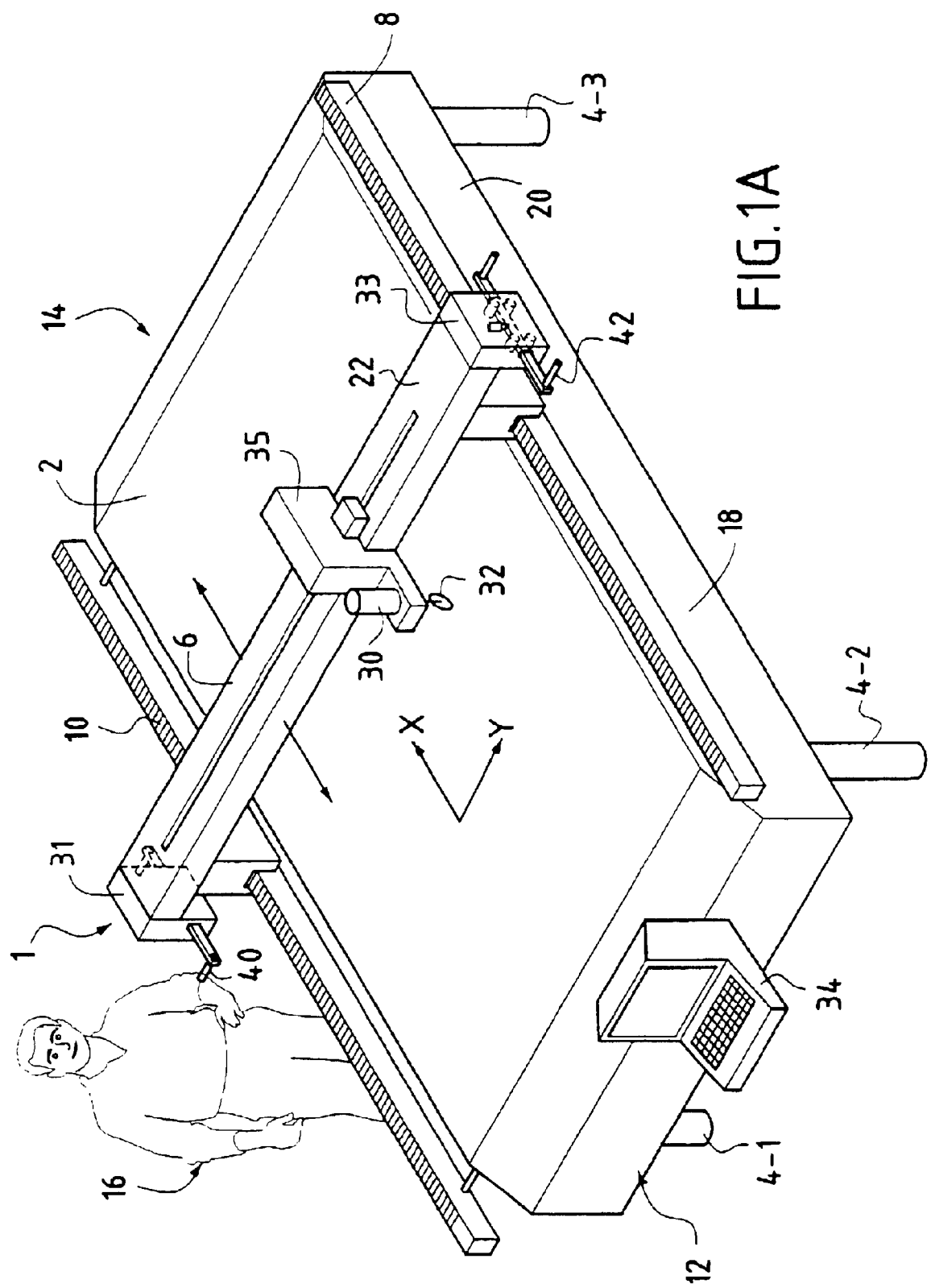
FIGS. 1A and 1B show a cutting table structure.
Figure 1B:
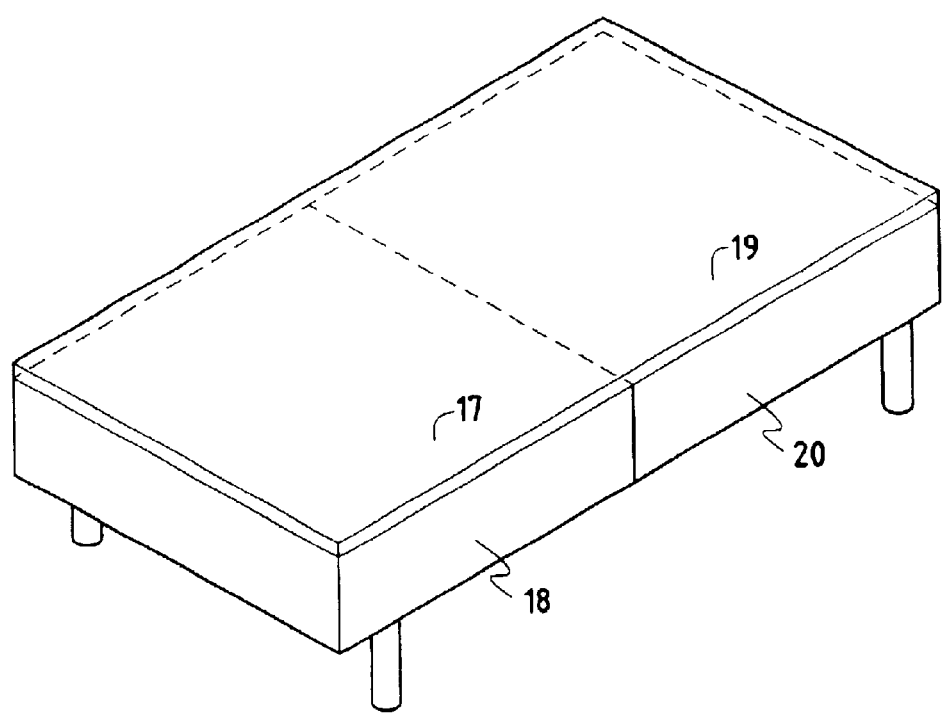

In this figure, as in the other figures, the reference numbers 22, 31, 33, 40, 42 designate the same items as in FIG. 1A.

An emitter cell 50 is placed at one end of the safety arm or bar 40. The cell comprises an infrared laser diode, for example, and emits a beam 51. A receiver cell 52 receives the beam 51.

The output signal of the cell 52 is connected to the drive motor of the boom 22. A variation in the intensity of this signal stops the boom 22.

Provided that the bars 40, 42 remain in the same initial position, and that no object interrupts the path of the beam 51, the output signal of the cell 52 remains constant and the boom continues to move.

The presence of a lateral obstacle causes relative movement of the bars 40, 42 and varies the output signal of the cell 52. This results in cutting off the power supply to the power circuit of the cutting machine; the braking module for the boom drive motors is actuated.

Similarly, as soon as an obstacle, for example the operator's hand, intercepts the path of the beam 51, the output signal of the cell 52 varies, with the same consequences.

In fact, the systems driving the boom 22 are stopped as soon as the optical systems 50, 52 are no longer aligned or as soon as the path of the beam 51 is interrupted.

Furthermore, each of the carriages 31, 33 can be constructed in the manner described above with reference to FIG. 2, with an electromechanical switch 41 inserted in a notch 39 in the corresponding bar 40, 42. The switches detect any movement of the bars 40, 42 relative to the carriages 31, 33.

Figure 2:
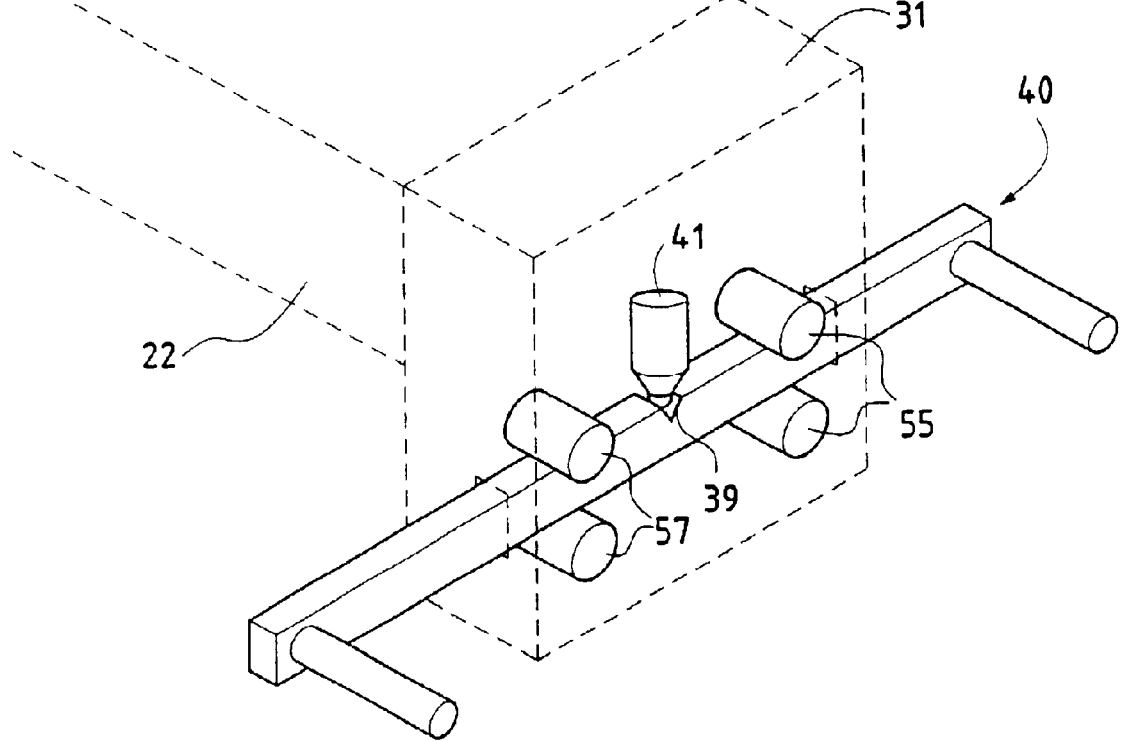
FIG. 2 shows a prior art lateral impact sensor system.

Each of the bars 40, 42 is then initially in the position shown in FIG. 2: each electromagnetic switch 41 is closed and the drive motors of the boom 22 drive movement thereof over the surface of the cutting table 2 in the normal manner (see FIG. 1A).

Immediately one of the two bars 40, 42 collides with a lateral obstacle, for example an operator standing beside the table 2, the bar is moved relative to the corresponding end of the boom. The end of the electromechanical sensor leaves its notch, switching off the boom drive system. What is more, the output signal of the cell 52 varies suddenly, which also results in cutting off the power supply to the power circuit of the cutting system, and the braking module for the boom drive motors is actuated.

The electromechanical sensor and the optical systems 50, 52 constitute a redundant safety system. If the receiver is no longer facing the emitter because of a collision with a lateral obstacle, the output signal of the cell 52 is modified, also cutting off the power supply to the power circuit of the cutting system and actuating the motor braking module.

The systems driving the boom 22 are therefore stopped as soon as one of the switches 41 leaves its notch, as soon as the optical systems 50, 52 are no longer aligned, or as soon as the path of the beam 51 is interrupted.

As shown in FIG. 3A, another emitter 60-receiver 62 pair can be placed at the other end of the bars 40, 42, this other pair also providing the functions of detecting obstacles at the other end of the boom 22 relative to the emitter 50-receiver 52 pair and detecting relative movement of the bars 40, 42. The second emitter-receiver pair operates in exactly the same way as the first pair 50–52.

Consequently, in the normal situation, the relative positions of the emitter cells 50, 60 and the receiver cells 52, 62 are such that the beam is transmitted correctly.

The cutting machine is stopped if there is an obstacle on the table 2 which intercepts one of the beams 51, 61.

On detection of a lateral obstacle, the relative position of the emitter and receiver cells is modified and the machine is stopped, as already explained hereinabove.

If the system further includes an electromechanical safety system, for example of the type described hereinabove with reference to FIG. 2, the optical sensor system 50, 52, 60, 62 again constitutes a redundant safety measure.

An emergency stop is therefore effected if mechanical interaction with one of the bars 40, 42 changes the state of the electromechanical switch. Because of this mechanical interaction, the cells 50 and 52 (and where applicable the cells 60 and 62) are no longer aligned and the beam is no longer transmitted correctly.

In a variant (FIG. 3B), the emitter 52 is, or the emitters 52 and 62 are, fixed to the boom 22 or to its ends 31, 33, and the same applies to the sensor 50 and, where applicable, the sensor 60. Reflectors 53, 63, 65, 67 orient the beam as required.

Figure 4A:
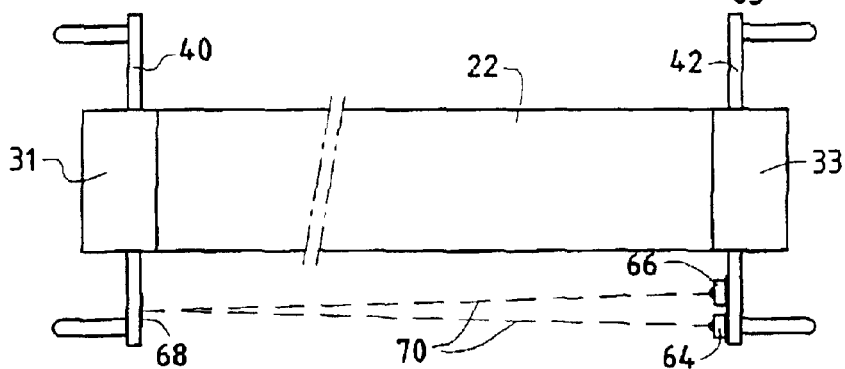

In another embodiment, shown in FIG. 4A, an emitter 64 and a receiver 66 are placed on the same bar 42. An infrared beam emitted by the emitter 64 is reflected onto the sensor 66 by a reflective member 68 fixed to the other bar 40.

Once again, any obstacle on the path 70 of the infrared beam suddenly modifies the output signal of the sensor 66, which stops the drive system of the boom 22. If one of the bars 40, 42 encounters an obstacle it is moved relative to the corresponding end 31, 33 of the boom. The beam emitted by the emitter 64 is then no longer reflected toward the sensor 66, which also stops the drive system of the boom 22.

Figure 4B:
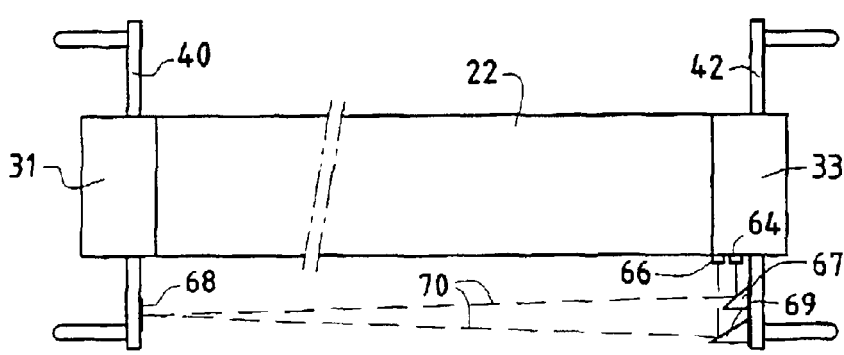

In a variant, shown in FIG. 4B, the emitter 64 and the sensor 66 are fixed to the boom itself (in this instance to one of its ends) and the beams are reflected by mirrors 67, 69 mounted on the bar 42.

Figure 3B:
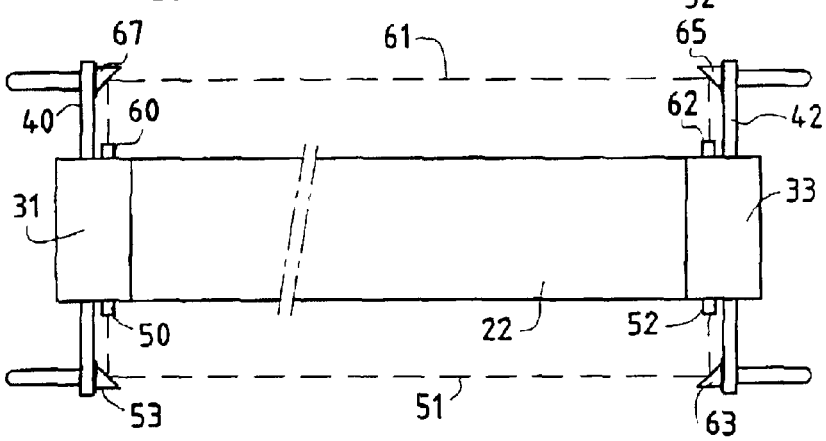

The embodiment of FIGS. 4A and 4B is easier to manufacture than that of FIGS. 3A and 3B because it necessitates modification of only one of the arms (the arm 42) and the reflector 68 can simply be stuck to the arm 40.

In FIGS. 4A and 4B, if an electromechanical sensor system is also provided, the emitter-reflector-sensor combination then provides a redundant safety measure operative in the event of failure of an electromechanical switch.

In all the variants described above, placing the emitter and receiver cells on the bars 40, 42 limits the inaccessible area on either side of the boom 22 to the minimum strictly necessary. Thus bringing up material can be managed efficiently in the area 14 of the system and likewise offloading in the front area 12 of the system and monitoring of cutting. In particular, monitoring of cutting may necessitate manual intervention on the part of the operator 16, at a location which, at the time, is far from the position of the boom and the cutting head. Such intervention does not necessitate interruption of cutting, which is interrupted only if the operator's hand or arm crosses one of the beams or one of the optical paths 51, 61 or 70. Thus the moving assembly in accordance with the invention is efficient and compatible with a high speed of the boom 22, from 0 to 3 m/s maximum.

Likewise, the presence of an object on the cutting table 2 interrupts cutting only if the object interrupts one of the beams or one of the optical paths 51, 61 or 70. This enables an operator to remove the object from the surface of the cutting table 2 before it interferes with the protection optical beams or paths, without interrupting cutting.

In another embodiment, shown in FIG. 5A, one or more emitters 72 are mounted on the moving boom, for example at each of its ends, each emitter 72 being associated with a sensor 74 with which it defines an optical path 78.

The connections 73, 75 by which the emitters 72 and the sensors 74 are connected to the boom can be rigid or deformable, in particular deformable in the direction of an axis X perpendicular to the axis of the boom.

An obstacle on one of the optical paths 78 modifies the output signal one or more of the sensors 74. This stops the drive system of the boom and the cutting head and causes cutting to be stopped.

As can be seen in FIG. 5A, the optical paths 78 pass over the carriage 35 which carries the cutting head 30. Accordingly, one of the optical paths 78 is interrupted if an operator attempts to work on the cutting head, the system 35 carrying the cutting head or the boom carrying the system 35, which causes the machine to be stopped, even though the sensor systems 40, 42 have again not detected a lateral obstacle.

The set of optical paths 51, 61, 78 defines a safety volume around the moving cutting system or around the boom 22 and the lateral sensor systems 40, 42. This reduces the size of the inaccessible areas of the machine to the minimum volume strictly necessary.

If the connections 73, 75 are rigid, lateral obstacles are detected by the lateral bars 40, 42 associated with the electromechanical sensor from FIG. 2 and/or the optical systems 50, 60, 52, 62.

If one or more of the connections 73, 75 is deformable in at least the direction of the axis X, it is possible to detect the presence of an object (for example the operator's arm) located above one end of the boom 22 that the sensor system 40, 42 would not be able to detect. If the object collides with one of the connections 73, 75, the transmission of the beam to one of the sensors is interrupted, which stops the machine in the manner already described hereinabove with reference to FIGS. 3A and 3B.

If the lateral bars are already equipped with systems for detecting their movement of the kind described above with reference to FIG. 2 and/or FIGS. 3A to 4B, the FIG. 5A embodiment improves the detection of lateral obstacles. It is then possible to detect the presence of a lateral obstacle. However, it is also possible to detect the presence of a hand or an arm above the end of the boom which the lateral bars with their sensor systems would not have been able to detect.

Once again, this embodiment allows efficient bringing up of material, offloading and monitoring of cutting. Intervention of an operator necessitates interruption of cutting only if the operator's hand or arm crosses one of the optical paths or beams 51, 61, 78, or if one of the lateral detection bars 40, 42 is struck, or if one of the connections 73, 75 that is deformable in the direction of the axis X is deformed.

FIG. 5B represents a variant of FIG. 5A in which supports 77 are mounted at each end of the boom 22. FIG. 5B shows only a part of the system, with which the other end can be symmetrical with respect to an axis of symmetry of the table. The support 77 is mounted on the lateral safety bar 42. Optical systems (only a portion 74 of which is shown) define optical paths 78 that pass over the carriage 35, as in FIG. 5A. With the paths 51, 61 these optical paths constitute a safety volume around the moving cutting system.

The same types of event stop the drive mechanism of the boom 22 as in FIG. 5A.

What is more, as in the case of the connections 73, 75 in FIG. 5A, the support 77 in FIG. 5B can be deformable in the direction of the axis X, which enables detection of lateral obstacles, and in particular the presence of an operator's hand or arm, even if the bars 40, 42 remain in their initial position.

Thus, in FIG. 5B, an operator can strike the hoop 77 at the point 81 (the impact or the collision is represented by an arrow), thereby displacing one of the sensors 74, which leads to stopping of the cutting machine, even though the bar 42 remains in its initial position.

In another embodiment, shown in FIG. 5C, a support 83 similar to the support 77 in FIG. 5B is deformable in the direction X. This support is fixed to one end of the boom 22. The lower end 85 of the support is fixed with respect to the end of the moving boom; unlike the preceding embodiments, the boom has no bar 40, 42 movable in the direction of the axis X relative to the boom 22. Detection of lateral obstacles is ensured by the flexibility or the deformable nature of the structure or the support 83 in the direction of the axis X. As in the FIG. 5B structure, the presence of an object, or any other obstacle, for example an operator's limb, which collides with the point 81, leads to the displacement of one of the sensors 74 or of one of the emitters (not shown in this figure), which once again leads to stopping of the cutting system.

Optical systems of the emitter/sensor type can be mounted on the lower portion 85 of the support, as in FIG. 3A, to detect the presence of objects on the surface of the cutting area.

Interruption of one of the optical beams by an operator's arm or hand also leads to stopping of the cutting system.

Instead of the hoop structure 77, 83 of FIGS. 5B and 5C, it is possible to use a structure connected to both ends 31, 33 of the moving boom 22 and provided with optical systems such as the emitter/receiver systems 72, 74, 75, 79 of FIGS. 5A to 5C, the structure having some flexibility or capacity for deformation in the direction of the axis X indicated in the figures. The presence of a lateral obstacle, for example an operator's limb, leads to deformation of this kind of structure and to interference with the optical paths between the emitter system and the receiver system that it carries. This interference with the optical path varies the intensity of the signal emitted by the sensors, which again leads to stopping of the cutting system.

The above kind of structure can be used without any other lateral sensor system, in particular without the system of bars 40, 42. It can also be combined with a system of bars 40, 42 moveable in the direction of the axis X relative to the boom 22 and tripping a system of electromechanical sensors, as already described hereinabove, or varying the signal received by one of the receivers fixed to the bars.

Combining the above kind of structure with the above kind of system with safety bars 40, 42 provides very efficient lateral detection.

Figure 6A:
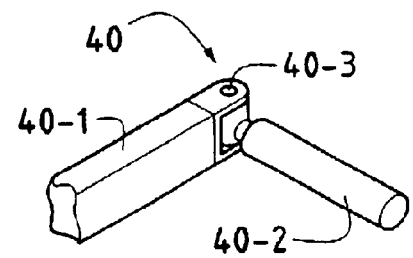
Figure 6B:
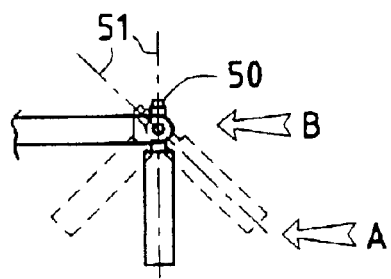

In a further embodiment, the lateral bars 40, 42 for detecting obstacles can take the form shown in FIGS. 6A and 6B. A second bar 40-2 rotatable about an axis or an articulation 40-3 is mounted at the end of a first bar 40-1. The emitter 50 is mounted at the end of the portion 40-2 and directs a beam across the cutting machine. If the portion 40-2 encounters a lateral obstacle or suffers an impact, as represented by the arrow A, it is caused to rotate, as shown in FIG. 6B, which deviates the beam emitted by the emitter 50. This again varies the output signal of the corresponding receiver (not shown in these figures) and stops the cutting system.

A lateral impact occurring along the axis of the bar 40-1, represented by the arrow B in FIG. 6B, results in tripping of the switch 41, as previously, and also in stopping of the machine. If a system of switches of the type shown in FIG. 2 is used, the combination of the emitter 50 and the receiver 52 again constitutes a second level of safety measures in the event of failure of one of the switches.

With an articulation of the type shown in FIGS. 6A and 6B, it is also possible to mount a sensor at the end of the portion 40-2. The two obstacle sensor bars 40, 42 can therefore both be equipped with this type of articulation at each end.

Figure 7A:
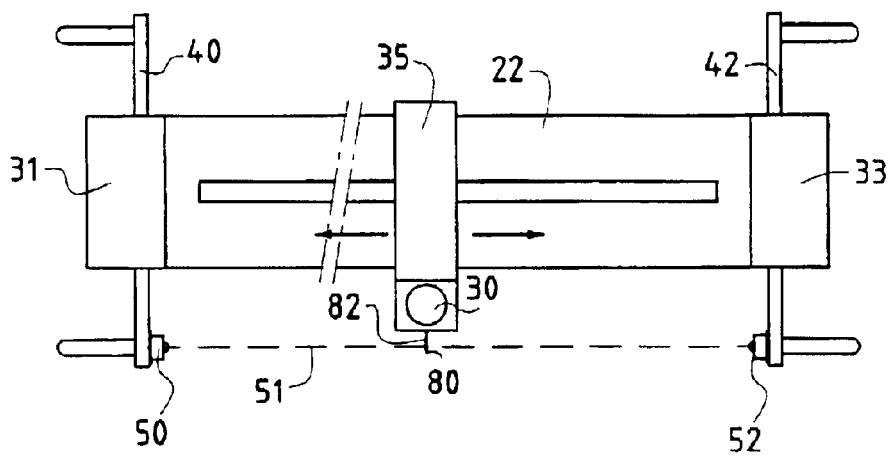

FIG. 7A shows another embodiment, in which reference numbers identical to those in FIG. 3 designate identical or corresponding elements. An optical element 80 is placed on the path of the boom 51 and is connected to the cutting head 30 or to the carriage 35 supporting the cutting head by a connection 82. This connection is not rigid, which allows modification of the relative position of the optical element 80 and the cutting head 30 if the optical element encounters an obstacle on its path. This again modifies the output signal of the sensor 52 and stops cutting.

If no obstacle is encountered, the element 80 remains fixed in position relative to the boom 51.

The optical element 80 can be an optical target, for example.

Figure 7B:
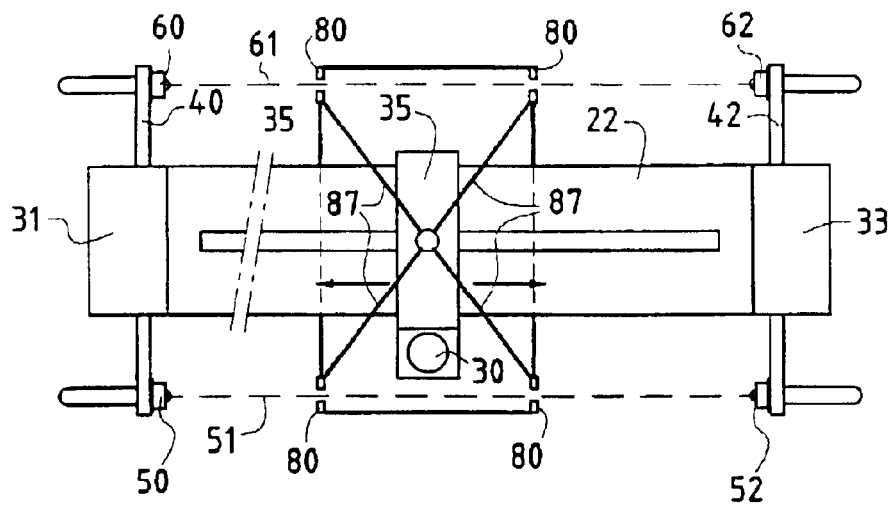
Figure 7C:
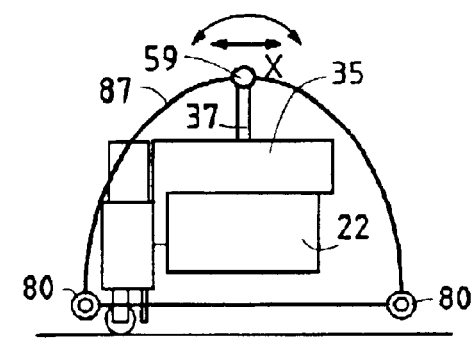

A variant of the above embodiment is shown in FIG. 7B (plan view) and in FIG. 7C (side view). A support 37 is placed on the carriage 35. Non-rigid connections 87 are provided at the end 59 of the support. Optical elements 80 at the free ends of the connections, such as those mentioned hereinabove in connection with FIG. 7A, are normally placed on the path of the beams 51, 61. As shown in FIG. 7C, these connections are joined at the top of the support 37 and preferably have a curved, circular arc or hooped shape, and thereby provide protection in the form of an "umbrella" or half-sphere around the combination formed by the working head 30 and its support 35. The combination is preferably rotatable about the end 59 of the support 37 and/or movable in translation along the axis X.

Figure 7D:
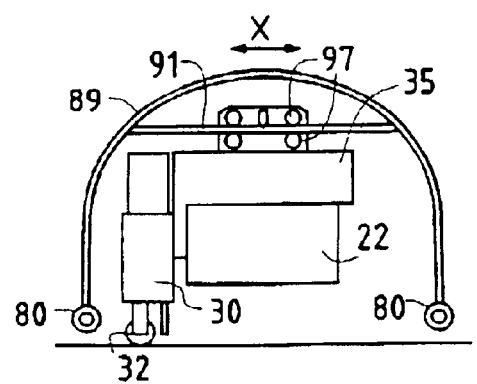

Another variant of the above embodiments is shown in side view in FIG. 7D. A set of supports or hoops 89 is mounted around the head 35. The supports can preferably be moved in translation along the axis X, for example by a rectilinear bar 91 and a system 97 for guiding the bar. Optical elements 80 at the ends of the supports are situated on the paths of the beams 51, 61. The envelope defined by the hoops is a portion of a half-cylinder.

In the above variants, the relative position of one of the optical elements 80 and the cutting head 30 is modified if the optical element support encounters an obstacle on its path. This again results in modification of the output signal of one of the sensors and stopping of the machine.

If no obstacle is encountered, the elements 80 remain fixed in position relative to the beams 51, 61.

The above embodiments can be combined with either of the embodiments described with reference to FIGS. 5A and 5B. Also, the emitter and/or the sensor can be fixed to the boom itself, a system of mirrors directing the boom correctly, as in FIG. 3B or FIG. 4B.

As a general rule, and as shown in FIG. 8A, the cutting head 30 is provided with a protective cover 84. This cover is open when the machine is stopped and an operator is working on the cutting head, for example replacing the cutting wheel 32.

Figure 8B:
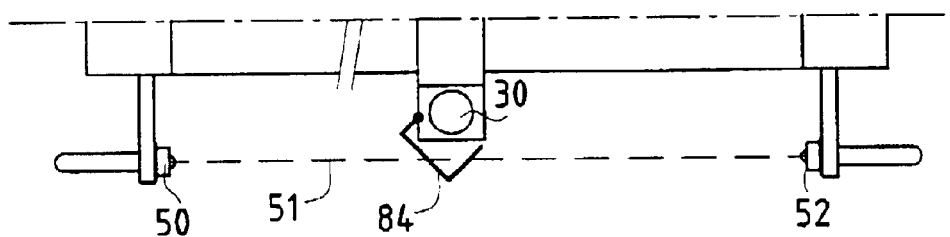

As shown in FIG. 8B, the dimensions of the system are preferably such that the cover 84 intersects the optical path 51 when it is not in its closed position. The output signal of the sensor 52 is then greatly modified, leading to stopping of cutting. Thus unintentional opening of the cover 84 while the system is operating is prevented. Similarly, any premature intervention by an operator while the cutting system is still active leads to total shutting down of the system and stopping of cutting, even if the boom 22 and the carriage 35 are stationary.

Figure 9:
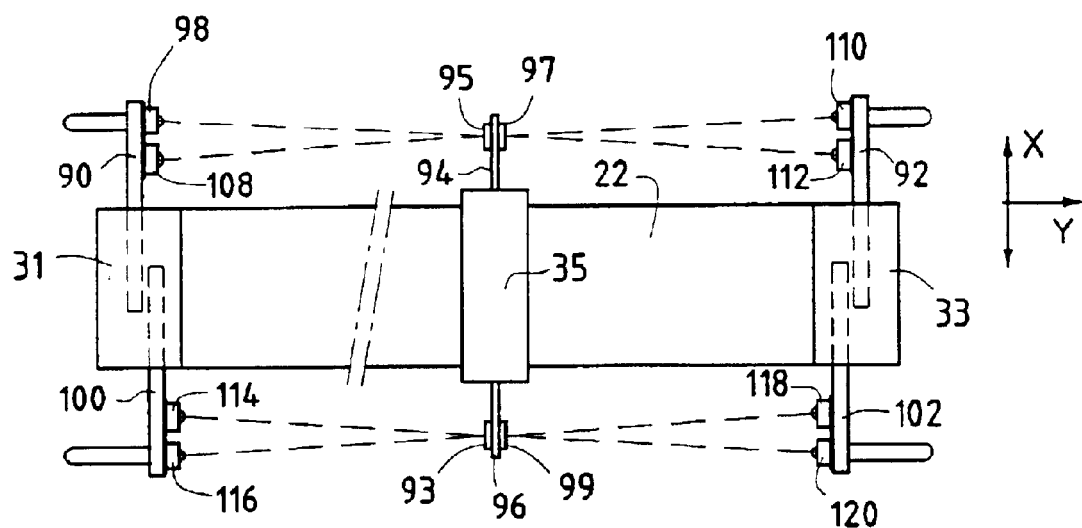

In another embodiment, shown in FIG. 9, the lateral bars for detecting obstacles each have a first part 90, 92 and an independent second part 100, 102. For example, an obstacle on the element 102 modifies the position of that element relative to the boom 22, without the relative position of the latter and the element 92 being modified. Each of the elements 90, 92, 100, 102 is provided with a system comprising a slot and an electromechanical switch, such as the system 39–41 from FIG. 2, for example. Displacement of either of these elements relative to the boom 22 trips the switch and stops the cutting machine, as already explained hereinabove.

What is more, optical systems can also detect movement of each of these elements relative to the facing element and relative to the boom 22.

For example, the element 90 can be provided with an emitter which emits a beam that is received by a receiver carried by the element 92. Movement of one of these elements relative to the other leads to a sudden variation in the output signal of the receiver and, once again, stopping of the drive system of the boom 22. It is also possible to provide an emitter and a receiver on one of the elements 90, 92 and to provide the other element with a reflector system, as in FIG. 4A or FIG. 4B.

The same type of sensor system can be provided on the elements 100, 102.

FIG. 9 shows an embodiment in which each of the elements 90, 92, 100, 102 is provided with an emitter 98, 110, 114, 118 and a receiver 108, 112, 116, 120. These optical systems are combined with reflector elements 95, 97, 93, 99 fixed by connections 94, 96 to the ends of the support 35 for the cutting head.

If the position of any of the bars 90, 92, 100, 102 is modified by the presence of a lateral obstacle, the output signal of the corresponding sensor varies suddenly, which leads to stopping of the drive system of the boom 22. This embodiment can further identify the position relative to the boom 22 of an obstacle situated on the path of one of the beams emitted by one of the emitters or reflected toward one of the sensors. It is possible to determine if the obstacle is in front of or behind the boom 22 (in the direction of the axis X) or in the right-hand part or the left-hand part of the boom (in the direction of the axis Y), according to which beam is interrupted. This information can be displayed on the display screen of a data processing system such as the system 34 shown in FIG. 1A, for example. The cutting table may be relatively large and it may be useful for an operator near the console 34 to be informed immediately of the position of an object on the cutting table, without the operator having to move nearer the boom 22.

This also makes it possible to store problems encountered when executing cutting operations. Any such problems can then be dealt with more effectively at a later time, for example, and productivity improved, in particular by improving materials handling around the machine.

The invention has been described in an application to a fixed table. It can equally well be applied to a cutting system with a moving table.

A moving table, incorporating a conveyor, has an overall structure similar to that described above in connection with FIG. 1A, for example. The cutting surface can be a material supporting and conveying system, as shown diagrammatically in FIG. 10.

The system comprises:
- a cutting support 192 comprising a microperforated polyurethane belt for conveying the material running around two idler shafts 194, 196,
- a table 198 under the belt provided with perforated, juxtaposed and transversely mounted boxes and surmounted by a perforated plate serving as a support for the microperforated belt, and
- a suction system 200 connected to each box, the combination holding the material down on the surface of the table by suction.

In another embodiment with a moving table, the cutting surface is a bristle mat comprising juxtaposed blocks on rails sliding on a chain running around two shafts. This kind of system is described in U.S. Pat. No. 4,328,726, for example.

The safety system according to the invention and the moving assembly according to the invention, combining electromechanical lateral obstacle sensor systems with optical systems fixed to the lateral obstacle sensor systems, have the same advantages as in the case of a fixed table.

The invention has been described with infrared emitter/receiver type optical systems. It is equally possible to use other emitter/receiver systems operating in other ranges of wavelengths (the visible spectrum, for example), the emitter being a laser source or diode, for example.

What is claimed is:

1. An obstacle detection system for a working system, said detection system comprising:
    a boom extending along a first axis between first and second ends and a working head mounted on said boom;
    first and second lateral obstacle sensor systems mounted at each end of the boom, movable or deformable relative to the boom and independently of each other in the direction of a second axis (X) substantially perpendicular to the first axis of the boom, and each sensor system having an extension in the same direction on either side of the boom; and first and second optical systems fixed to the first and second lateral obstacle sensor systems to detect the presence of an obstacle in the path of the boom and to detect movement and/or deformation of the lateral obstacle sensor systems relative to each other.

2. The detection system according to claim 1, wherein the first and second optical systems each comprise a radiation emitter and a radiation sensor.

3. The detection system according to claim 2, wherein an emitter is fixed to one of the lateral obstacle sensor systems and the associated sensor is fixed to the other lateral obstacle sensor system.

4. The detection system according to either claim 2, wherein an emitter and the associated sensor are fixed to the same lateral obstacle sensor system and a reflector system is fixed to the other lateral obstacle sensor system.

5. The detection system according to claim 2, wherein an emitter and the associated sensor are fixed to one end of the boom and a reflector system is fixed either to the lateral obstacle sensor system at the other end of the boom or to the other end of the boom.

6. The detection system according to any one of claim 1, further including third and fourth optical systems for detecting obstacles in the path of the boom and wherein each third and fourth optical system is mounted on the boom by means of a rigid or deformable connection extending above the boom.

7. The detection system according to claim 7, wherein each of the third and fourth obstacle sensing optical systems mounted on the boom include a first radiation emitter and a first radiation sensor.

8. The detection system according to claim 8, wherein the first radiation emitter and the first radiation sensor of the third and fourth obstacle sensing optical systems are respectively fixed to the connection means at a first end and to the connection means at a second end of the boom.

9. The detection system according to claim 8, wherein the first radiation emitter of the third and fourth obstacle sensing optical systems and the first radiation sensor of the third and fourth obstacle sensing optical systems are fixed to the connection means at the same end of the boom and a reflector system is fixed to the connection means at the other end of the boom to reflect radiation from the first emitter toward the first sensor.

10. The detection system according to claim 7, wherein a safety volume around the boom is defined by the first and second fixed optical systems on the first and second lateral obstacle sensor systems and the third and fourth optical systems mounted on the connection means on the boom.

11. The detection system according to claim 1, further including respective first and second movement sensors associated with the first and second lateral obstacle sensor systems for sensing obstacles that are laterally disposed relative to the boom.

12. The detection system according to claim 13, wherein the first and second movement sensors associated with the first and second lateral obstacle sensor systems include an electromechanical sensor.

13. The detection system according to claim 1, wherein the first and second lateral obstacle sensor systems further include a support mounted on the first and second lateral obstacle sensor systems and a fifth optical system fixed to the support to detect obstacles when the boom moves.

14. A system according to claim 15, wherein the support is deformable in said direction along the second axis (X) perpendicular to the first axis of the boom and the fifth optical systems mounted on the support can detect deformation of the support along the second axis (X).

15. The detection system according to claim 1, wherein each of the first and second lateral obstacle sensor systems has a first part movable in the direction of the second axis (X) substantially perpendicular to the first axis of the boom and a second part articulated to the first part and able to rotate about a third axis substantially perpendicular to said direction of the second axis and a fifth optical system is fixed to the second part.

16. The detection system according to claim 1, wherein the first lateral obstacle sensor system has first and second parts moveable relative to each other and each provided with optical systems for detecting an obstacle on the path of the boom and movement of one of the lateral obstacle sensor systems relative to the other one.

17. The detection system according to claim 18, wherein the second lateral obstacle sensor system has third and fourth parts moveable relative to each other and each provided with optical systems for detecting the presence of an obstacle on the path of the boom and movement of one of the lateral obstacle sensor systems relative to the other one.

18. The detection system according to claim 1, wherein at least one of the first and second lateral obstacle sensor systems is deformable in at least one direction (X) perpendicular to the first axis of the boom.

19. The detection system according to claim 20, wherein the deformable lateral obstacle sensor system comprises a deformable support on which the optical systems for detecting obstacles and deformation of the deformable support are mounted.

20. The detection system according to claim 20, further comprising optical systems mounted on the deformable lateral obstacle sensor systems and with the first and second optical systems defining a safety volume around the boom.

21. The detection system according to claim 1, wherein the first and second optical systems fixed to the first and second lateral obstacle sensor systems define an optical path through an optical element connected to the working head wherein the position of the optical element relative to the working head varies if the optical element encounters an obstacle during movement of the boom and/or movement of the working head.

22. The detection system according to claim 23, wherein the optical element is mounted on a structure comprising a support element on the working head.

23. The detection system according to claim 24, wherein the support element takes the form of a hoop.

24. The detection system according to claim 25, including a plurality of support elements taking the form of hoops defining a hemispherical or cylindrical envelope around the working head.

25. The detection system according to claim 26, wherein the hemispherical or cylindrical envelope is movable in rotation and/or in translation relative to the working head.

26. The detection system according to claim 1, wherein the working head includes a protective cover which protects the working head when the protective cover is closed and which intersects an optical path defined between the first and second optical systems fixed to the first and second lateral obstacle sensor systems.

* * * * *